(12) United States Patent
Li et al.

(10) Patent No.: US 10,869,313 B2
(45) Date of Patent: Dec. 15, 2020

(54) ORTHOGONAL FREQUENCY DIVISION MULTIPLE ACCESS BASED UPLINK ACCESS METHOD

(71) Applicant: XIDIAN UNIVERSITY, Shaanxi (CN)

(72) Inventors: Jiandong Li, Shaanxi (CN); Hongyan Li, Shaanxi (CN); Shun Zhang, Shaanxi (CN); Ting Zheng, Shaanxi (CN); Ronghui Hou, Shaanxi (CN); Zhicong Xie, Shaanxi (CN); Pengyu Huang, Shaanxi (CN); Yinghong Ma, Shaanxi (CN); Min Sheng, Shaanxi (CN); Yan Zhang, Shaanxi (CN); Qin Liu, Shaanxi (CN)

(73) Assignee: XIDIAN UNIVERSITY, Shaanxi (CN)

( * ) Notice: Subject to any disclaimer, the term of this patent is extended or adjusted under 35 U.S.C. 154(b) by 82 days.

(21) Appl. No.: 16/312,935

(22) PCT Filed: Jun. 23, 2017

(86) PCT No.: PCT/CN2017/089707
§ 371 (c)(1),
(2) Date: Dec. 21, 2018

(87) PCT Pub. No.: WO2017/220011
PCT Pub. Date: Dec. 28, 2017

(65) Prior Publication Data
US 2019/0327739 A1 Oct. 24, 2019

(30) Foreign Application Priority Data

Jun. 24, 2016 (CN) .......................... 2016 1 0472278

(51) Int. Cl.
*H04W 72/04* (2009.01)
*H04L 5/00* (2006.01)
(Continued)

(52) U.S. Cl.
CPC ....... *H04W 72/0453* (2013.01); *H04L 5/0007* (2013.01); *H04L 5/0037* (2013.01);
(Continued)

(58) Field of Classification Search
CPC ....... H04L 5/0007; H04L 5/0037; H04L 5/00; H04L 5/0053; H04W 72/04;
(Continued)

(56) References Cited

U.S. PATENT DOCUMENTS 10,154,520 B1 * 12/2018 Hedayat ............ H04W 74/0833
2016/0143006 A1 * 5/2016 Ghosh ................ H04W 74/004
370/329

(Continued)

FOREIGN PATENT DOCUMENTS

CN        104378828 A      2/2015
CN        105050199 A     11/2015
(Continued)

OTHER PUBLICATIONS

International Search Report dated Sep. 19, 2017 from International Patent application No. PCT/CN2017/089707 filed Jun. 23, 2017.

*Primary Examiner* — Robert J Lopata
(74) *Attorney, Agent, or Firm* — Workman Nydegger

(57) ABSTRACT

An embodiment of the present invention provides an uplink access method based on an orthogonal frequency-division multiple access mechanism, comprising: determining the number of subchannels available for a current transmission and the number of time slot blocks required for the current access; transmitting uplink access trigger frames on the available subchannels; randomly selecting among the available subchannels and the time slot blocks; and transmitting an uplink access response frame to an access point by the randomly selected available subchannel and time slot block, to perform random access. The embodiment of the present (Continued)

invention can reduce an average time taken by users to access channels, thereby reducing transmission delay of data packet, reducing waste of time and subchannel resources, and improving the throughput of the entire network.

10 Claims, 2 Drawing Sheets

(51) Int. Cl.
   *H04W 74/08* (2009.01)
   *H04W 84/12* (2009.01)
(52) U.S. Cl.
   CPC ..... *H04W 72/042* (2013.01); *H04W 74/0833* (2013.01); *H04W 84/12* (2013.01)
(58) Field of Classification Search
   CPC ........... H04W 72/042; H04W 72/0453; H04W 74/04; H04W 74/0833; H04W 84/12
   USPC ........................................................ 370/330
   See application file for complete search history.

(56) References Cited

U.S. PATENT DOCUMENTS

| | | | |
|---|---|---|---|
| 2016/0183305 A1* | 6/2016 | Huang | H04W 74/0833 |
| | | | 370/329 |
| 2016/0212702 A1* | 7/2016 | Ghosh | H04L 47/10 |
| 2017/0273140 A1* | 9/2017 | Ryu | H04W 74/004 |
| 2018/0077601 A1* | 3/2018 | Kim | H04W 28/0278 |
| 2018/0084605 A1* | 3/2018 | Li | H04W 74/0858 |
| 2018/0124858 A1* | 5/2018 | Gan | H04L 1/1621 |
| 2018/0199375 A1* | 7/2018 | Nezou | H04W 74/0816 |
| 2018/0310338 A1* | 10/2018 | Li | H04L 5/0094 |
| 2018/0352550 A1* | 12/2018 | Wilhelmsson | H04W 4/70 |
| 2019/0007973 A1* | 1/2019 | Lou | H04W 74/0816 |
| 2019/0261418 A1* | 8/2019 | Chu | H04W 74/004 |
| 2020/0106489 A1* | 4/2020 | Chu | H04L 5/0007 |

FOREIGN PATENT DOCUMENTS

| | | |
|---|---|---|
| CN | 105376830 A | 3/2016 |
| CN | 105978675 A | 9/2016 |

* cited by examiner

ORTHOGONAL FREQUENCY DIVISION MULTIPLE ACCESS BASED UPLINK ACCESS METHOD

CROSS-REFERENCE TO RELATED APPLICATIONS

The present invention is a 35 U.S.C. § 371 U.S. National Stage of PCT Application No. PCT/CN2017/089707, filed Jun. 23, 2017, which claims the benefit of Chinese Patent Application No. 201610472278.8, filed Jun. 24, 2016. The entire content of each of the aforementioned patent applications is incorporated herein by reference.

TECHNICAL FIELD

The present invention relates to the field of wireless communication technologies, and in particular, to a multiple access method, which can be used for parallel access of multiple stations (STAs) in a densely deployed WLAN environment to improve overall system performance.

BACKGROUND

The orthogonal frequency division multiple access (OFDMA) has been widely used in long-term evolution (LTE) and Worldwide Interoperability for Microwave Access (WiMax), and will be introduced into the next generation wireless local area network (WLAN). Using the OFDMA mechanism, the physical channel can be divided into a plurality of subchannels, each of which is composed of one or more orthogonal subcarriers. In the next generation WLAN, users can simultaneously send control frames to an access point (AP) on different subchannels to request transmission opportunities, and can simultaneously transmit data packets on the subchannels, which can result in higher efficiency of multiple access.

At present, the application environment of WLAN differs greatly from that of the initial protocol design, mainly in a high-density deployment environment, including high-density deployment of terminals within a cell, and high-density deployment of APs belonging to different operators and individual users. In the high-density deployment environment, the characteristics of no central control and the random multiple access protocol based on carrier sense multiple access with collision avoidance (CSMA/CA) lead to more serious conflicts and backoffs; the configuration of multiple parameters in the protocol lacks adaptability, so that the resource allocation of WLAN is mismatched with dynamically changing service needs. The increase of the average throughput of the network is not proportional to the increase of the link rate, and the gap between the theoretical throughput of the network and the actual carrying throughput is large.

The existing OFDMA-based multiple access protocols mainly focus on increasing the throughput of the entire network by improving capabilities of multi-user parallel access and parallel transmission. To ensure that multiple users can simultaneously perform uplink data transmission, the existing OFMDA based uplink access methods can be divided into two categories:

(1). AP Managed Uplink Access Methods

In this category of methods, AP sends a trigger frame for polling all of associated users, and asks each STA whether it has uplink data to be transmitted; the STA responds with a response frame indicating whether it has uplink data to be transmitted; if yes, the uplink data information is simultaneously reported; after obtaining uplink data information, AP sends a frame to perform synchronization of uplink orthogonal frequency division multiple access (UL-OFDMA).

(2). STA Random Uplink Access Methods

In this category of methods, STAs having uplink data to be transmitted access channels in the manner of competition and backoff, and send a request frame; each time only one STA is successfully accessed; after receiving the request frame, AP responds to it and informs that other STAs having uplink service transmissions perform channel access until all available channels are allocated.

In the case that the number of users is small and the network coverage is not very dense, the above schemes may be used to reduce the competition backoff time, and improve the system throughput. However, in the dense WLAN environment, the above access methods require a large amount of access time, which would reduce the system throughput significantly.

SUMMARY OF THE INVENTION

The objective of the present invention is to provide an OFDMA based uplink access method, to reduce the average time taken by users to access channels, thereby reducing the transmission delay of data packets and improving throughput of the entire network, and overcoming the deficiencies of the prior art described above.

To achieve the above objective, an embodiment of the present invention provides an OFDMA based uplink access method, comprising: determining the number of subchannels available for the current transmission, and the number of time slot blocks required for the current access; transmitting, on the available subchannels, an uplink access trigger frame; randomly selecting among the available subchannels and the time slot blocks; and transmitting an uplink access response frame to an AP by using the randomly selected available subchannel and the time slot block, to perform random access.

An embodiment of the present invention further provides an OFDMA based uplink access method, comprising:

(1) transmitting, by an AP, an uplink access trigger frame T on all of n available subchannels $C_1, C_2, \ldots, C_i \ldots C_n$, the frame containing the number m of total time slot blocks, where $i \in (1, n)$, and m is a parameter that can be dynamically adjusted according to the successful access probability of the last transmission;

(2) when multiple STAs receive the uplink access trigger frame T and have uplink data to be transmitted, after waiting for a short inter-frame space (SIFS) plus a time interval of (j−1) uplink access response frames R, transmitting the uplink access response frame R to the AP on subchannel $C_i$; where i is randomly selected from [1, n], j is randomly selected from [1, m];

(3) counting, by the AP, the number N of STAs which did not transmit data and whose uplink access response frames have been successfully received, if N>n, performing step (3b); otherwise, performing step (3a);

(3a) randomly selecting, by the AP, N subchannels from n subchannels; sorting N subchannels in ascending order of sequence numbers; sorting N STAs whose response frames have been received and did not transmit data, in ascending order of the MAC addresses; pairing the two sequences in accordance with the sorted orders; placing the pairing result in an uplink resource allocation frame; after waiting for a SIFS, transmitting the uplink resource allocation frame on the selected N available subchannels; wherein the MAC address uniquely identify the STA;

(3b) sorting n subchannels in ascending order of sequence numbers; sorting N STAs whose response frames have been received, in ascending order of their MAC addresses; sequentially allocating n sorted subchannels to the first n sorted STAs; placing the pairing result in an uplink resource allocation frame; after waiting for a SIFS, transmitting the uplink resource allocation frame on the selected n available subchannels; and recording the MAC addresses of k=(N−n) users that do not perform the current transmission, for use in a next data transmission;

(4) after receiving the uplink resource allocation frames, checking, by the STA, the uplink resource allocation frames to determine whether the subchannels have been allocated to the STA; and if so, after waiting for a SIFS, transmitting the uplink data frame on the allocated subchannel;

(5) after receiving the uplink data frame, recording, by the AP, the receipt state of the uplink data frame, and checking the recorded k value; if k>0, then N=min{k, n}, letting k=0 and returning to step (3), performing a next resource allocation for the N STAs which have not transmitted data yet; otherwise, generating, by the AP, the response frame BA based on the recorded receipt state of data packets; after waiting for a SIFS, transmitting the response frames BA on the corresponding subchannels, the frame containing MAC addresses of all STAs whose uplink data frames have been correctly received; and (6) after receiving the response frame BA, checking, by the STA, whether the response frame BA contains the MAC address of the user, and if so, determining that the current uplink data transmission is successful, otherwise, the transmission fails.

The above described embodiments of the present invention have the following advantages over the prior art:

Firstly, the above stated embodiments of the present invention introduce a random access mechanism for time-frequency resource blocks, which can ensure that multiple users can successfully access in one transmission by fully utilizing time and subchannel resources, to reduce average time taken by users to access channels, thereby reducing the transmission delay of data packets and improving the throughput of the entire network.

Secondly, the above stated embodiments of the present invention can dynamically adjust the number m of total time slot blocks based on the successful access probability in the last access process, to reduce the waste of time and subchannel resources, thereby improving the throughput of the entire network.

DETAILED DESCRIPTION OF EMBODIMENTS

Figure 1:
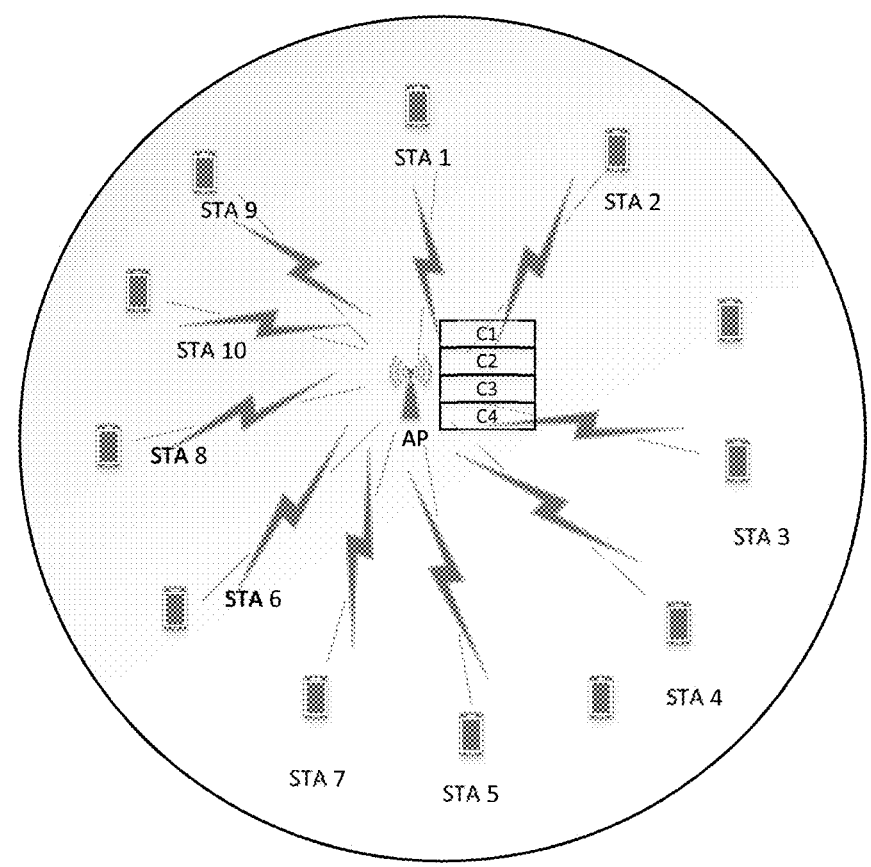
FIG. 1 shows an application scene of an embodiment of the present invention.

Embodiments of the present invention will be described in detail below with reference to the accompanying drawings:

Referring to FIG. 1, an application scene of an embodiment of the present invention includes one wireless AP, and ten wireless terminals located within the coverage range of the wireless AP; the wireless terminals have uplink data to be transmitted, and are respectively identified as STA1, STA2 . . . , STA10; and the wireless AP detects four available subchannels $C_1$, $C_2$, $C_3$ and $C_4$; wherein the positions of users of the terminals are non-uniformly distributed.

Figure 2:
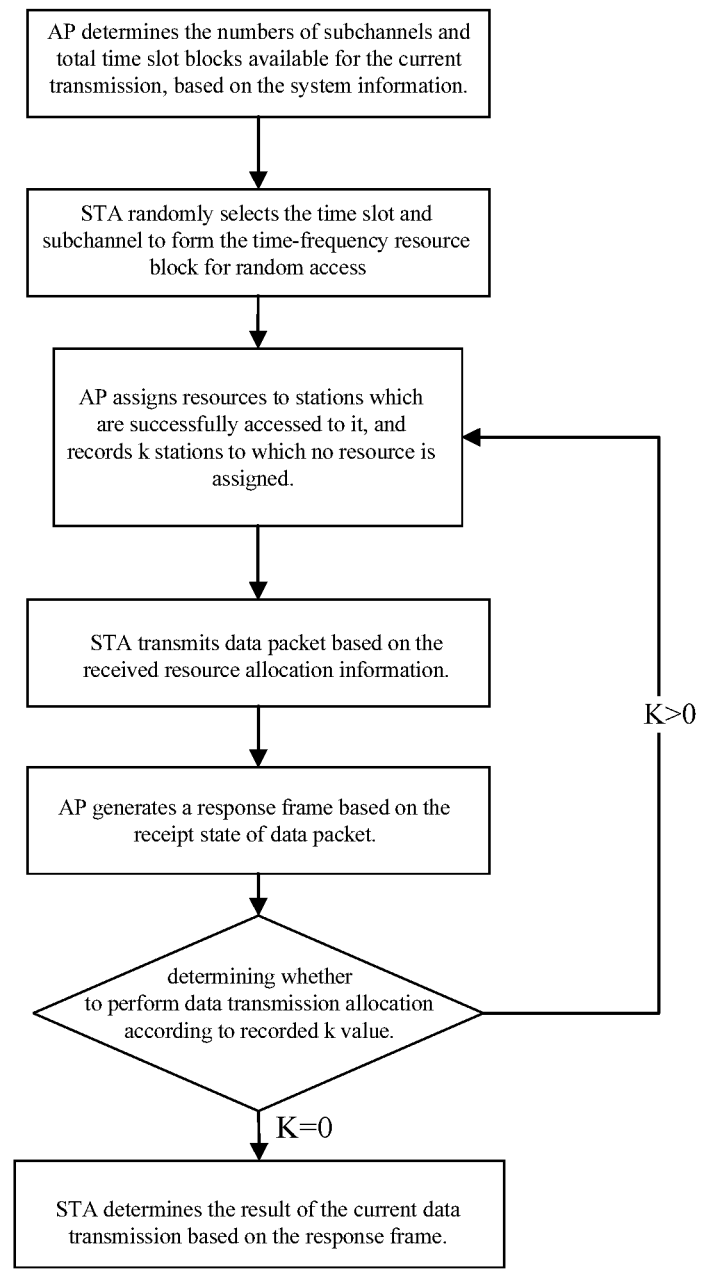
FIG. 2 shows a flow chart of a method embodiment of the present invention.

Referring to FIG. 2, the steps based on OFDMA are as follows:

Step 1: determining, by the AP, the numbers of subchannels and total time slot blocks which are available for the current transmission, based on the system information.

The system information includes the probability of the last successful transmission and idle subchannels detected by the AP. The scene of FIG. 1 shows four available subchannels, namely, a first available subchannel $C_1$, a second available subchannel $C_2$, a third available subchannel $C_3$ and a fourth available subchannel $C_4$. Further, based on the probability of the last transmission success, four time slot blocks required for the current access are determined. The AP transmits an uplink access trigger frame T on the detected four available subchannels which are idle. The frame contains a parameter, i.e., the number 4 of total slot blocks, and the four slot blocks are respectively represented as a first slot block $S_1$, a second slot block $S_2$, a third slot block $S_3$ and a fourth time slot block $S_4$.

The subchannel refers to a frequency domain resource with the same bandwidth, and carriers used for every two adjacent subchannels are orthogonal to each other.

The time slot block refers to a time domain resource used for random access which is sequentially divided into $S_1$, $S_2$, $S_3$ and $S_4$, in the transmission duration of the uplink access response frame R as a unit.

The uplink access trigger frame T is a radio transmission frame transmitted by broadcast, and is a type of control frame for notifying the STA to perform random access.

The AP may send a radio transmission frame on all detected idle subchannels to inform the STA to access a selectable subchannel. The uplink access response frame R includes a time slot block in which the channel access can be performed, to inform the STA of time slot blocks selectable for access.

Step 2: randomly selecting, by the STA, the time-frequency resource block and transmitting an uplink access response frame for random access.

2.1) when STA 1 to STA 10 receive the uplink access trigger frame T and have the uplink data to be transmitted, after waiting for a SIFS, the each STA composes an uplink access response frame, randomly select i-th subchannel $C_i$ in the four available channels respectively, and randomly select j-th time slot block $S_j$ in the four time slot blocks, to form a time-frequency resource block $[C_i, S_j]$, where i∈(1, 4), j∈(1, 4). STA1 to STA10 select time-frequency resource blocks $[C_1, S_3]$, $[C_2, S_1]$, $[C_1, S_3]$, $[C_2, S_4]$, $[C_3, S_1]$, $[C_4, S_3]$, $[C_1, S_1]$, $[C_2, S_3]$, $[C_4, S_2]$ and $[C_3, S_2]$, respectively.

2.2) Each of STA1 to STA10 transmits an uplink access response frame R to the AP on the selected time-frequency resource blocks $[C_i, S_j]$.

The SIFS is the time required for transition of the STA from the receipt state to the transmit state, that is, the time required for transition from receiving the uplink access trigger frame T to transmitting the uplink access response frame R.

The time-frequency resource block $[C_i, S_j]$ is the minimum unit in two-dimension of time domain and frequency domain, which is composed of a time slot block and a subchannel, and used for access.

The uplink access response frame R is a radio transmission frame transmitted by unicast and is a type of control frame for responding to the uplink access trigger frame T.

The frame is transmitted on the selected time-frequency resource block, and includes a MAC address which can uniquely identify a STA.

Step 3: counting, by the AP, the number N of successfully accessed STAs, assigning resources to them, and recording k STAs which no resource is assigned.

3.1) the AP receives in four time slot blocks, and counts the number 8 of STAs whose uplink access response frames have been successfully received by the AP, that is, STA2, STA4, STA5, STA6, STA7, STA8, STA9 and STA10;

3.2) the STAs are assigned with subchannels for data transmission by using the following resource assigning algorithm:

sorting, in ascending order, the MAC addresses of the STAs that are successfully accessed, that is, STA4, STA2, STA10, STA7, STA6, STA9, STA5 and STA8; sorting the four subchannels in ascending order of sequence numbers, that is, $C_1$, $C_2$, $C_3$ and $C_4$; and sequentially allocating the sorted four subchannels to four STAs with first sorted MAC addresses in the ascending order;

3.3) the two sorted sequences are paired in order; and the pairing result is as follows:

allocating STA4 with a first MAC address in the ascending order to a first available subchannel $C_1$, allocating STA2 with a second MAC address in the ascending order to a second available subchannel $C_2$, allocating STA10 with a third MAC address in the ascending order to a third available subchannel $C_3$, and allocating STA7 with a fourth MAC address in the ascending order to a fourth available subchannel $C_4$;

3.4) the above pairing result is placed in the uplink resource allocation frame; and after waiting for a SIFS, the uplink resource allocation frame is transmitted on the four subchannels;

3.5) the number k of STAs to which no subchannel is allocated for the current transmission is recorded, where k is an integer greater than or equal to 0. In this embodiment, k=4, that is, four STAs may be used in a next resource allocation.

The uplink resource allocation frame is a radio transmission frame transmitted by broadcast, and is a type of control frame. The frame includes a channel allocation result for the STA that is successfully accessed.

Step 4: transmitting, by the STA, a data frame based on the received resource allocation information.

4.1) after receiving the uplink resource allocation frame, STA1 to STA10 check the uplink resource allocation frame to know that the subchannels allocated by the AP to STA4, STA2, STA10 and STA7 are $C_1$, $C_2$, $C_3$ and $C_4$, respectively; and no subchannel resource is allocated to remaining STAs;

4.2) STA4, STA2, STA10 and STA7 perform corresponding processing operations, and transmit uplink data frames on the corresponding subchannels after waiting for a SIFS, and other STAs to which no subchannel is assigned continue to wait for the resource allocation frame;

the data packet is a radio transmission frame transmitted by unicast, and is a valid data unit in the current transmission.

Step 5: generating, by AP, a response frame based on the receipt state of the data packet, and determining whether to perform the next resource allocation according to the recorded k value.

5.1) after receiving the data packet transmitted by the STA, the AP generates a response frame BA containing the MAC address of the STA which receives the correct data;

5.2) the AP checks the recorded k value; if k>0, the process returns to step 3. In this example, k is equal to 4, and the next resource allocation is performed for the recorded four STAs; otherwise, step 5.3) is performed;

5.3) the AP performs a corresponding processing operation and transmits the response frame BA on the four subchannels after waiting for a SIFS.

The response frame is a radio transmission frame transmitted by unicast, which is a type of control frame. The frame includes a MAC address of a STA receiving the correct data packet.

Step 6: determining the result of the current data transmission based on the response frame.

After receiving the response frame, the STA performing the data transmission checks whether the response frame contains the MAC address of this user; if yes, the current uplink data transmission is correct; otherwise, the transmission fails, and the process returns to step 1, to enter the next access.

The above description merely involves specific examples of the present invention. It is obvious to those skilled in the art that the present invention may be modified and changed in the form and details without departing from principles and structures of the present invention. Various modifications and changes may be made based on thoughts of the present invention, but are intended to be included within the scope of the appended claims.

The invention claimed is:

1. An uplink access method based on an orthogonal frequency division multiple access (OFDMA) mechanism, comprising:

determining the number of subchannels available for the current transmission, and the number of time slot blocks required for the current access;

transmitting, on each available subchannel, uplink access trigger frames;

randomly selecting among the available subchannels and the time slot blocks;

transmitting an uplink access response frame to an access point (AP) by using the randomly selected available subchannel and the time slot block, to perform random access;

counting the number of successfully accessed stations (STAs);

assigning, to the successfully accessed STAs, available subchannels for data transmission; and transmitting, by the STAs which are assigned with the available subchannels, uplink data frames on the assigned subchannels;

wherein the number of successfully accessed STAs is N, the number of available subchannels is n; and when N is less than or equal to n, the step of assigning available subchannels comprises:

randomly selecting N subchannels from n subchannels;

sorting N subchannels in ascending order of sequence numbers;

sorting N STAs whose response frame has been received, in ascending order of their MAC addresses;

pairing the two sorted sequences in accordance with the sorted orders, placing the pairing result in an uplink resource allocation frame; and after waiting for a predetermined time slot, transmitting the uplink resource allocation frames on the selected N available subchannels, wherein the MAC address uniquely identifies the STA.

2. The method of claim 1, further comprising:
dynamically adjusting the number of the time slot blocks based on a successful access probability of the last transmission.

3. The method of claim 1, further comprising:
generating a response frame based on a receipt state of the uplink data frame; and
determining a result of the current data transmission based on the response frame.

4. An uplink access method based on an orthogonal frequency division multiple access (OFDMA) mechanism, comprising:
determining the number of subchannels available for the current transmission, and the number of time slot blocks required for the current access;
transmitting, on each available subchannel, uplink access trigger frames;
randomly selecting among the available subchannels and the time slot blocks; and
transmitting an uplink access response frame to an access point (AP) by using the randomly selected available subchannel and the time slot block, to perform random access;
counting the number of successfully accessed stations (STAs);
assigning, to the successfully accessed STAs, available subchannels for data transmission; and
transmitting, by the STAs which are assigned with the available subchannels, uplink data frames on the assigned subchannels;
wherein the number of successfully accessed STAs is N, the number of the available subchannels is n; and when N is greater than n, the step of assigning available subchannels comprises:
sorting n available subchannels in ascending order of sequence numbers;
sorting N successfully accessed STAs in ascending order of their MAC addresses;
sequentially allocating n sorted subchannels to the first n sorted STAs;
placing the pairing result in uplink resource allocation frames;
after waiting for a predetermined time slot, transmitting the uplink resource allocation frame on the n available subchannels; and
recording the MAC addresses of k=(N−n) STAs that do not perform the current transmission, for use in the next data transmission.

5. The method of claim 1, wherein the duration of one time slot block is the time required for transmitting one uplink access response frame.

6. The method of claim 1, wherein the predetermined time slot is the time required for transition of the STA from a receipt state to a transmit state.

7. An uplink access method based on an orthogonal frequency division multiple access (OFDMA) mechanism, comprising:
(1) transmitting, by an access point (AP), uplink access trigger frames T on all of n available subchannels $C_1$, $C_2$, ..., $C_i$, ... $C_n$, the frames containing the number m of total time slot blocks, where i∈(1, n), and m is a parameter that can be dynamically adjusted according to the successful access probability of the last transmission;
(2) when multiple STAs receive the uplink access trigger frame T and have uplink data to be transmitted, after waiting for a SIFS plus time interval of (j−1) uplink access response frames R, transmitting the uplink access response frame R to the AP on subchannel $C_i$; where i is randomly selected from [1, n], and j is randomly selected from [1, m];
(3) counting, by the AP, the number N of STAs which did not transmit data and whose uplink access response frames have been successfully received; if N>n, performing step (3b);
otherwise, performing step (3a);
(3a) randomly selecting, by the AP, N subchannels from n subchannels; sorting N subchannels in ascending order of sequence numbers; sorting N STAs whose response frames have been received and did not transmit data, in ascending order of the MAC addresses; pairing the two sequences in accordance with the sorted orders; placing the pairing result in an uplink resource allocation frame; after waiting for a SIFS, transmitting the uplink resource allocation frame on the selected N available subchannels; wherein the MAC address uniquely identifies the STA;
(3b) sorting n subchannels in ascending order of sequence numbers; sorting N STAs whose response frames have been received, in ascending order of their MAC addresses; sequentially allocating n sorted subchannels to the first n sorted STAs; placing the pairing result in an uplink resource allocation frame; after waiting for a SIFS, transmitting the uplink resource allocation frames on the n available subchannels; and recording the MAC addresses of k=(N-n) users that do not perform the current transmission, for use in a next data transmission;
(4) after receiving the uplink resource allocation frames, checking, by the STA, the uplink resource allocation frames to determine whether subchannels have been allocated to the STA; and if so, after waiting for a SIFS, transmitting the uplink data frame on the allocated subchannel;
(5) after receiving the uplink data frame, recording, by the AP, the receipt state of the uplink data frame, and checking the recorded k value; if k>0, then N=min{k, n}, letting k=0 and returning to step (3), performing a next resource allocation for the N STAs which have not transmitted data yet; otherwise, generating, by the AP, the response frames BA based on the recorded receipt state of data packet; after waiting for a SIFS, transmitting the response frames BA on the corresponding subchannels, the frames containing all the MAC addresses of STAs whose uplink data frames have been correctly received; and
(6) after receiving the response frame BA, checking, by the STA, whether the response frame BA contains its own MAC address, and if so, determining that the current uplink data transmission is successful, otherwise, the transmission fails.

8. The method of claim 4, wherein the predetermined time slot is the time required for transition of the STA from a receipt state to a transmit state.

9. The method of claim 1, wherein all of the time slot blocks required for the current access are continuous.

10. The method of claim 1, further comprising:
performing multiple data transmissions, until all of the successfully accessed STAs transmit the uplink data frames on the assigned available subchannels.

* * * * *